US009965174B2

(12) United States Patent
Herbordt et al.

(10) Patent No.: US 9,965,174 B2
(45) Date of Patent: May 8, 2018

(54) MULTITOUCH GESTURES FOR A MEASUREMENT SYSTEM

(71) Applicant: Rohde & Schwarz GmbH & Co. KG, Munich (DE)

(72) Inventors: Wlfgang Herbordt, Ottobrunn (DE); Friedrich Reich, Stadtbergen (DE); Barry Rowland, Groebenzell (DE); Rene Muessig, Grafing (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 143 days.

(21) Appl. No.: 14/783,033

(22) PCT Filed: Apr. 8, 2013

(86) PCT No.: PCT/EP2013/057306
§ 371 (c)(1),
(2) Date: Oct. 7, 2015

(87) PCT Pub. No.: WO2014/166518
PCT Pub. Date: Oct. 16, 2014

(65) Prior Publication Data
US 2016/0070461 A1    Mar. 10, 2016

(51) Int. Cl.
G06F 3/0488    (2013.01)
G06F 3/041     (2006.01)
G06F 3/0484    (2013.01)

(52) U.S. Cl.
CPC ........ G06F 3/04883 (2013.01); G06F 3/0416 (2013.01); G06F 3/04842 (2013.01);
(Continued)

(58) Field of Classification Search
CPC ............... G06F 3/04883; G06F 3/0416; G06F 3/04842; G06F 3/04845; G06F 2203/04104; G06F 2203/04808
See application file for complete search history.

(56) References Cited

U.S. PATENT DOCUMENTS 7,030,861 B1    4/2006  Westerman et al.
7,479,949 B2    1/2009  Jobs et al.
(Continued)

FOREIGN PATENT DOCUMENTS

WO    2012/080029 A1    6/2012
WO    20121081901 A2    6/2012

OTHER PUBLICATIONS

Steve Young:"Cognitive User Interfaces" IEEE Signal Processing Magazine, IEEE Service Center, Piscataway, NJ, US, vol. 27, No. 3, May 1, 2010.

*Primary Examiner* — Shaheda Abdin
(74) *Attorney, Agent, or Firm* — Ditthavong & Steiner, P.C.

(57) ABSTRACT

A Method for a measurement system, wherein the measurement system includes a touch-screen, a control-unit for the touch-screen, a measurement hardware, a measurement application and a gesture detection unit, wherein the measurement application interacts with the measurement hardware. In a first step the control-unit detects a position and/or a movement of one or more physical objects on and/or near the touch-screen. In a second step the gesture detection unit assigns the position and/or the movement of one or more physical objects to one gesture within a set of gestures. In a third step the gesture detection unit communicated the detected gesture to the measurement application. Furthermore, the measurement application performs a different function for the same detected gesture depending on a user interface of the measurement application which is displayed on the touch-screen when the gesture is detected.

14 Claims, 7 Drawing Sheets

Figure 1:
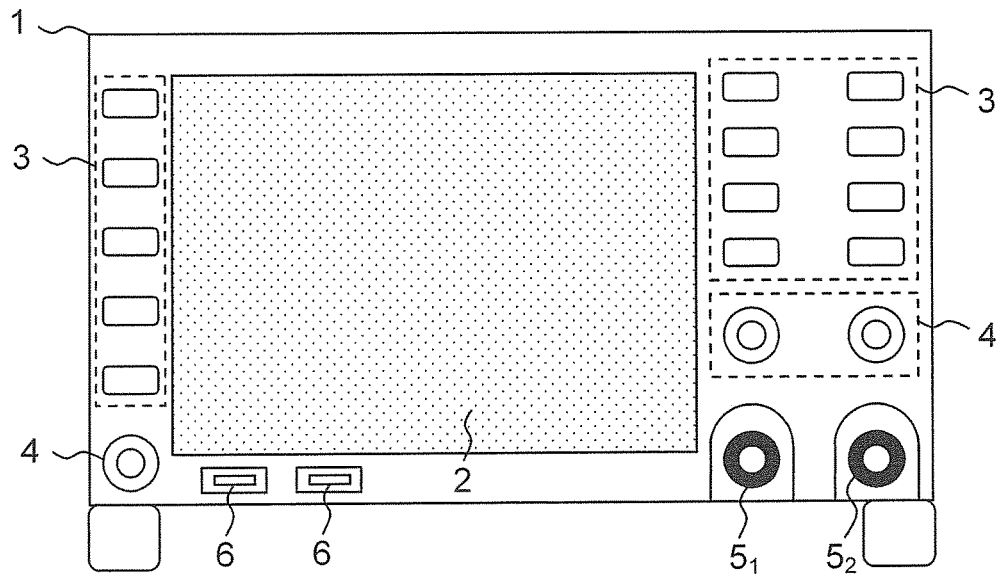

(52) U.S. Cl.
CPC .................. *G06F 3/04845* (2013.01); *G06F 2203/04104* (2013.01); *G06F 2203/04808* (2013.01)

(56) References Cited

U.S. PATENT DOCUMENTS

| | | | |
|---|---|---|---|
| 7,705,830 | B2 | 4/2010 | Westerman et al. |
| 2002/0126099 | A1 | 9/2002 | Engholm |
| 2004/0021633 | A1* | 2/2004 | Rajkowski ............ G06F 3/0233 345/156 |
| 2007/0177803 | A1 | 8/2007 | Elias et al. |
| 2008/0040692 | A1* | 2/2008 | Sunday ............... G06F 3/04883 715/863 |
| 2008/0163130 | A1 | 7/2008 | Westerman |
| 2008/0165022 | A1* | 7/2008 | Herz .................. G06F 3/017 340/669 |
| 2009/0051671 | A1* | 2/2009 | Konstas ............. G06F 3/04886 345/174 |
| 2009/0228792 | A1 | 9/2009 | Van Os et al. |
| 2010/0188406 | A1 | 7/2010 | Kincaid |
| 2010/0315413 | A1* | 12/2010 | Izadi .................. G06F 3/017 345/419 |
| 2011/0074696 | A1 | 3/2011 | Rapp et al. |
| 2011/0074710 | A1 | 3/2011 | Weeldreyer et al. |
| 2012/0169774 | A1 | 7/2012 | Yu |
| 2012/0249595 | A1* | 10/2012 | Feinstein ............. G06F 1/1694 345/642 |
| 2013/0155027 | A1* | 6/2013 | Holmgren ........... G06F 3/0421 345/175 |

\* cited by examiner

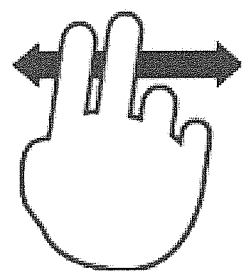 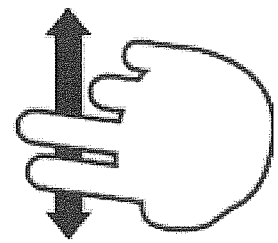
Fig. 7I    Fig. 7J
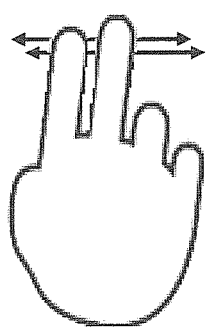 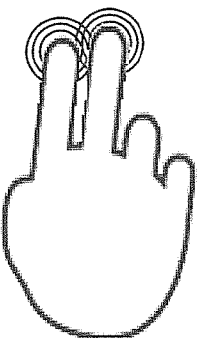 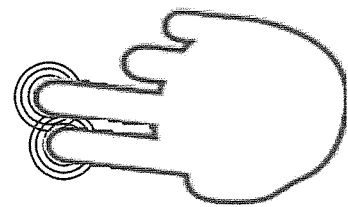
Fig. 7k    Fig. 7L    Fig. 7M
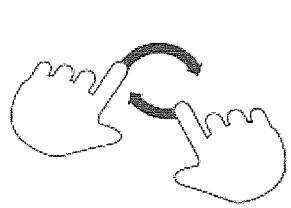 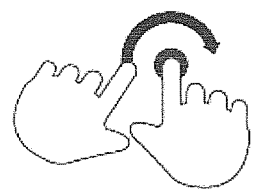 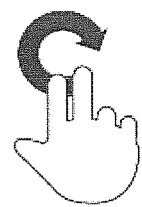
Fig. 7N    Fig. 7O    Fig. 7P
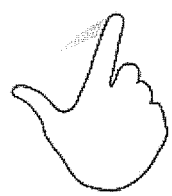
Fig. 7Q

MULTITOUCH GESTURES FOR A MEASUREMENT SYSTEM

CROSS-REFERENCE TO RELATED APPLICATION

The present application is a national phase application of PCT Application No. PCT/EP2013/057306, filed Apr. 8, 2013, the entire contents of which are herein incorporated by reference.

TECHNICAL FIELD

The invention, according to the various embodiments described herein, relates to a method for a measurement system and the measurement system itself. The method allows operating the measurement system in an advanced manner.

BACKGROUND

In the recent years, measurement systems have become more and more complex. A plurality of information can be entered by the user as well as displayed to the user. Thus, the needed screen became larger over the years. That is why there is a discrepancy between the size of the screen and the amount of input units, such as buttons, surrounding the screen. A larger screen allows measurement signals to be displayed in a higher detail to the user. However, in this case the amount of input units has to be reduced for achieving a compact measurement system. Therefore, the trend is going to touch-screens, allowing a user to enter the required information by tipping his fingers on the respective parts of the touch-screen.

Document WO 2012/080029 A1, which is herein incorporated by reference, describes a method and for operating a measurement system as well as the respective measurement system. A plurality set of gestures is used to perform distinctive functions within the measurement system by drawing them on a touch-screen. It is a drawback of WO 2012/080029 A1 that a large set of gestures are used and have to be memorized by the user, because each gesture performs the same function within the whole measurement application even if there is no use for such a function at the present position.

SUMMARY

Thus, it is an object of the present invention to reduce the overall set of gestures a user has to memorize without reducing the numbers of functions that can be executed within the measurement system by drawing a gesture on the touch-screen.

A method for a measurement system according to one embodiment, wherein the measurement system may include a touch-screen, a control-unit for the touch-screen, a measurement hardware, a measurement application and a gesture detection unit, describes several steps. In a first step a position and/or a movement of one or more physical objects on and/or near the touch-screen is detected by the control-unit. In a second step the position and/or the movement of one or more physical objects is assigned to one gesture within a set of gestures by a gesture detection unit. In a third step the detected gesture is communicated to the measurement application by the gesture detecting unit. Furthermore the measurement application performs a different function for the same detected gesture depending on a user interface of the measurement application which is displayed on the touch-screen when the gesture is detected.

In one embodiment, the measurement application performs a different function for the same detected gesture depending on a user interface of the measurement application, which is displayed on the touch-screen when the gesture is detected. For example, a plurality of user interfaces together forming the measurement application are displayed on the touch-screen at the same time. A first user interface and a second user interface share the touch-screen for example. If a user draws a specific gesture on the respective part of the touch-screen, which is assigned to the first user interface, a different function of the measurement application is performed as if the gesture is drawn on another part of the touch-screen on which the second user-interface is displayed. Thus, the function to be executed by a respective gesture only depends on which part of the touch-screen the gesture is drawn. Therefore, the total amount of gestures a user has to memorize is reduced drastically.

In another embodiment, if a first user interface displays at least one measurement signal in the time domain and/or if a second user interface displays at least one measured signal in the frequency domain and/or if a third user interface displays the signal, which is displayed in the first and/or second user interface with an adjusted zoom and/or if a fourth user interface displays a hardware block diagram describing the configuration of a measurement hardware and/or if a fifth user interface displays a history of recorded acquisitions and/or if a sixth user interface displays search results of the recorded acquisitions. By having six different user interfaces the amount of gestures can be reduced by a factor of six. It is also very advantageous that one or more user interfaces can be displayed on the touch-screen at the same time.

In yet another embodiment, the measurement system may include a touch-screen, a control-unit for the touch-screen, a measurement hardware, a measurement application and a gesture detection unit and that the measurement application interacts with the measurement hardware, wherein the control-unit detects a position or a movement of one or more physical objects on and/or near the touch-screen, wherein the gesture detection unit assigns the position and/or the movement of one or more physical objects to one gesture within a set of gestures, and wherein the gesture detection unit communicates the detected gesture to the measurement application. The measurement application performs thereby a different function for the same detected gesture depending on a user interface of the measurement application which is displayed on the touch-screen when the gesture is detected.

In another embodiment, the measurement application performs a different function for the same detected gesture depending on a user interface of the measurement application, which is displayed on the touch-screen when the gesture is detected. It is clear that the measurement application may include a plurality of user interfaces, which are displayed on the touch-screen at the same time or one after another. If a plurality of user interfaces is displayed on the touch-screen at the same time, each user interface is displayed at a respective part of the touch-screen. Depending on which part of the touch-screen the gesture is drawn by the user, the measurement application performs a different function, because the gesture detection unit communicates the detected gesture as well as the respective part of the touch-screen on which the gesture is detected to the measurement application. The measurement application knows which user interface is displayed on the respective part of the touch-screen and therefore knows on which user interface the gesture has been drawn. By performing different functions for the same detected gestures the total number of gestures a user has to memorize can be reduced significantly.

Figure 2:
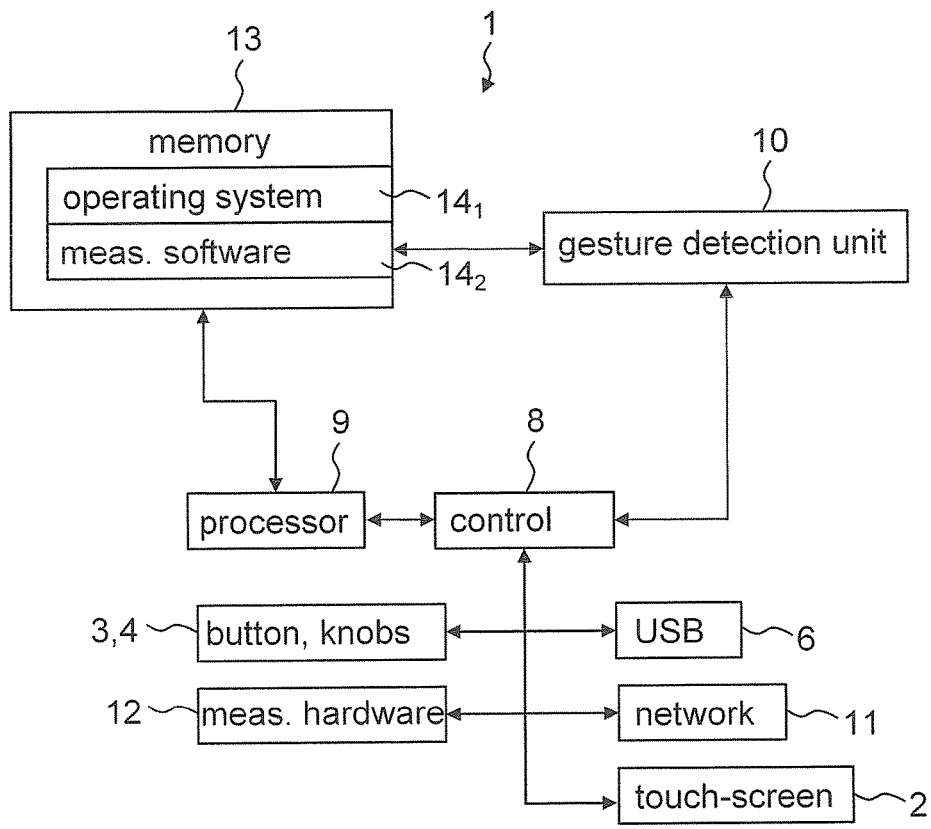
Figure 3:
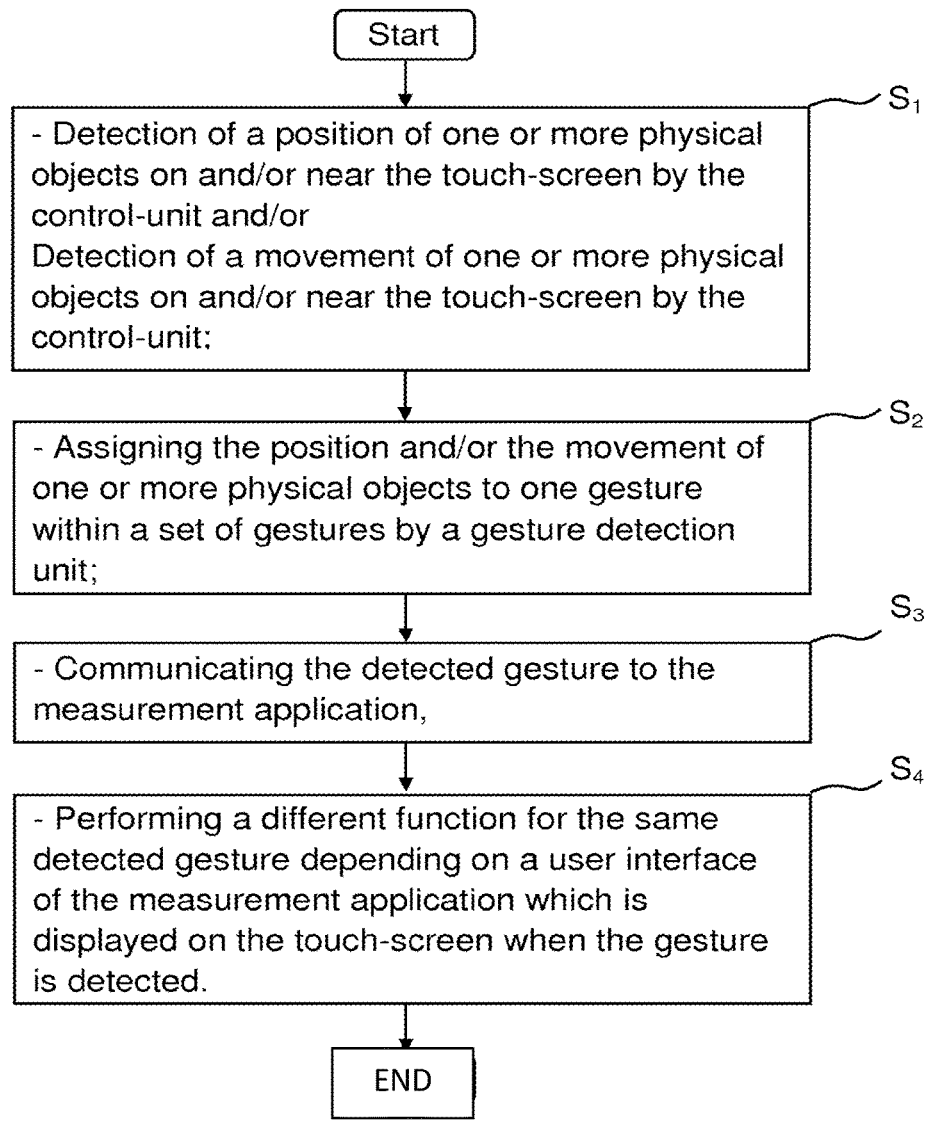
Figure 4:
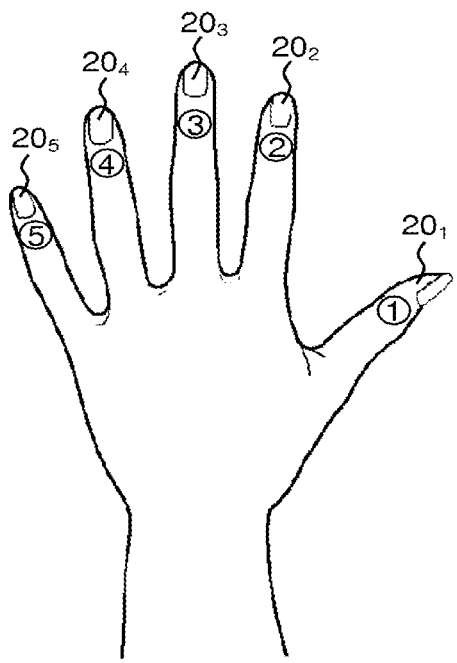
Figure 5A:
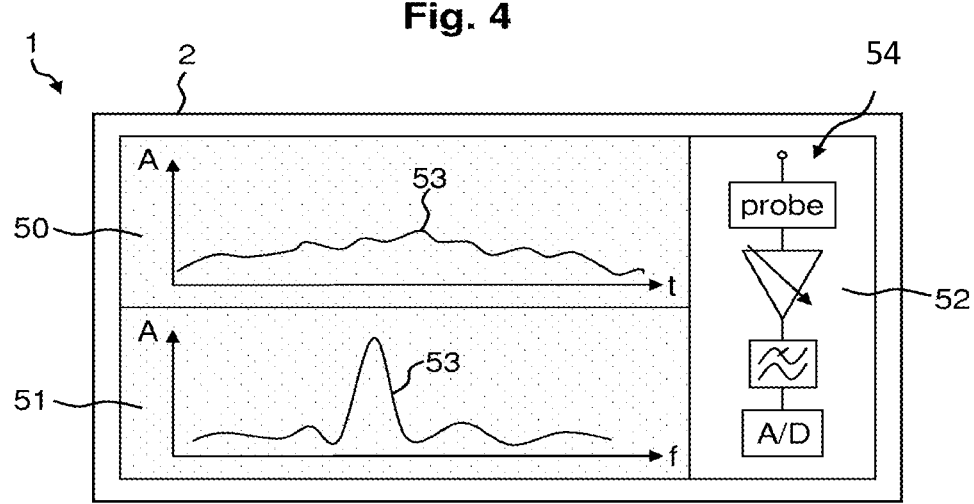
Figure 5B:
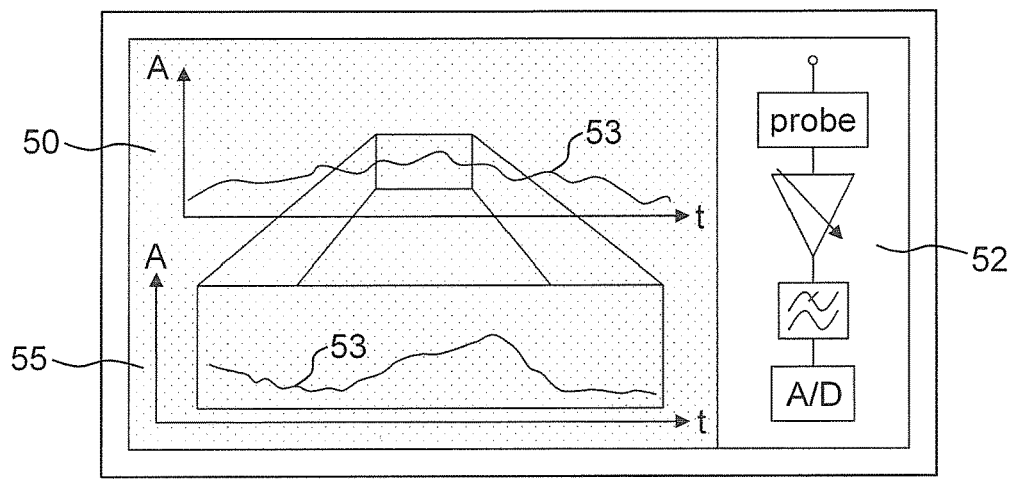
Figure 5C:
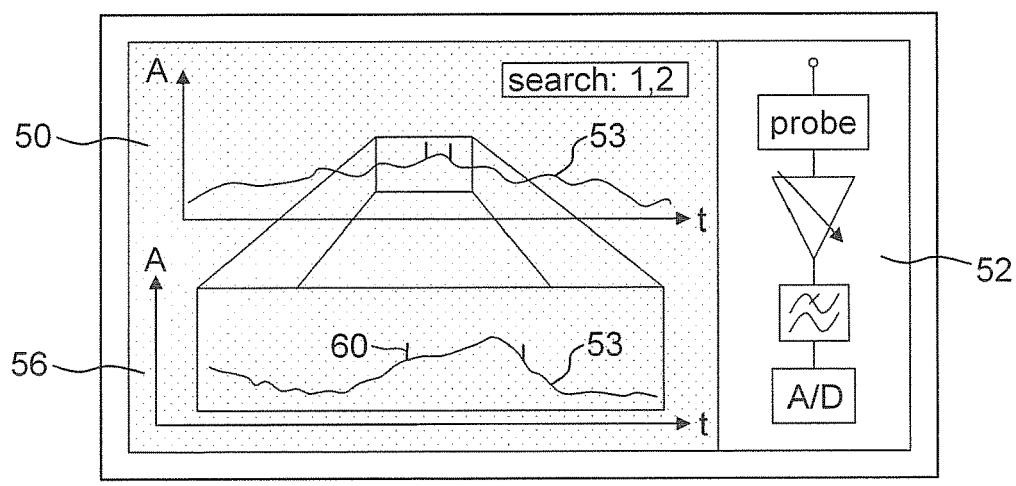
Figure 5D:
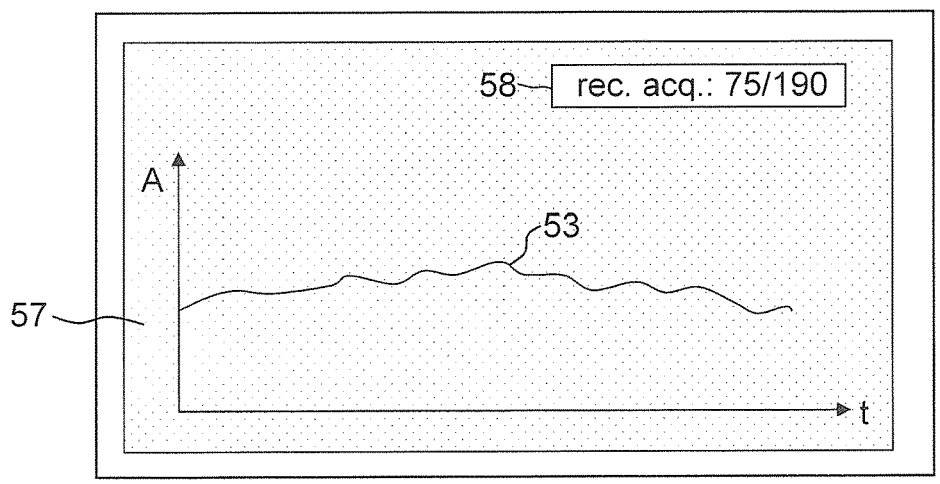
Figure 6A:
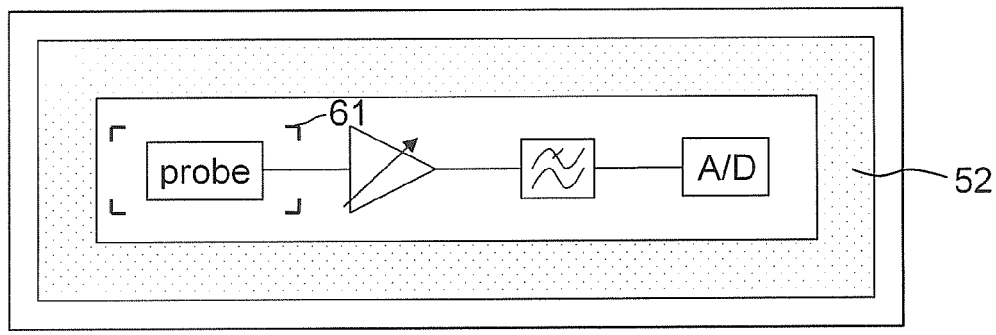
Figure 6B:
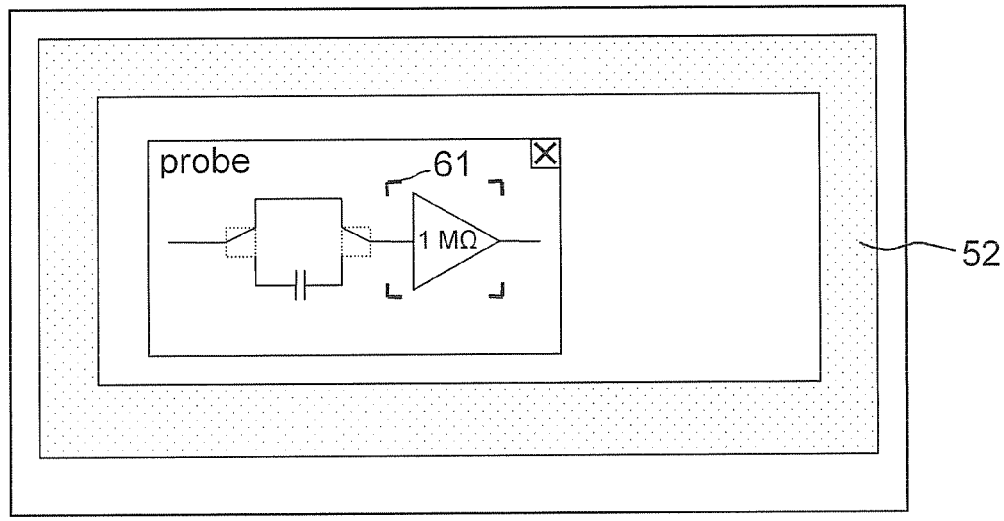
Figure 7A:

Different embodiments of the present invention are described exemplary in the following in reference to the drawings. This is done by the way of example without limitation. The same feature has always the same reference sign. The figures in the drawings show in detail:

FIG. 1 a front view of a measurement system such as an oscilloscope for example;

FIG. 2 a block diagram of the measurement system according to an embodiment of the present invention;

FIG. 3 a flow chart of the method for the measurement system according to an embodiment of the present invention;

FIG. 4 a hand with several fingers for illustrating the notation of the different gestures;

FIG. 5A a display of the measurement system showing three different user interfaces;

FIG. 5B the display of the measurement system showing three different user interfaces, wherein one user interfaces show the zoomed view of at least one part of another user interface;

FIG. 5C the display of the measurement system showing three different user interfaces, wherein one user interface shows the zoomed view of at least one part of another user interface, wherein this part complies with a search request;

FIG. 5D the display of the measurement system showing another user interface displaying one of a plurality of recorded acquisitions;

FIG. 6A the display of the measurement system showing a hardware block diagram;

FIG. 6B the display of the measurement system showing one part of the hardware block diagram with higher details; and FIGS. 7A to 7Q different gestures according to the present invention.

FIG. 1 shows an exemplary embodiment of the measurement system 1 according to the present invention. The measurement system 1 can be any type of a measurement system, like an oscilloscope or a spectrum analyzer or the like. The measurement system 1 includes a touch-screen 2, which could be of a resistive and/or capacitive and/or inductive type. Any other types of touch-screens 2 can also be used within the measurement system 1. The measurement system 1 shown in FIG. 1 includes also a plurality of buttons 3 and control knobs 4. Those input units (buttons and control knobs) can be illuminated with different colors and can be used by the user for performing basic adjustments in a quick and direct manner. The measurement system 1 also includes a plurality of input ports $5_1$, $5_2$, which are used to feed one or more measurement signals to the measurement hardware 12, which is not shown in FIG. 1. Furthermore, the measurement system 1 also includes connectors for connecting additional periphery. Those connectors are USB-connectors 6 (universal serial bus) for example.

Measurement system 1, which can be used for a plurality of measurement methods, include complex user interfaces having a plurality of convoluted layers. For operating the measurement system 1, a plurality of buttons 3 and control knobs 4 are attached to the measurement system 1. The outer dimensions of the measurement system are also often predetermined, which results in little space in the front panel for displaying the measurement results. Larger touch-screens 2 come with the benefit of higher resolutions, allowing displaying more periods of a signal. By reducing the numbers of buttons 3 and control knobs 4, the operation of the measurement system 1 has also to be in such a way that the user does not need to scroll through a plurality of context menus. Thus, the measurement system 1 according to the present invention operates on a plurality of soft-keys and gestures. The touch-screen 2 is able to detect a plurality of contacts as well as movements on and/or near the touch-screen 2.

A gesture is thereby a contact and/or a movement of one or more physical objects on and/or near the touch-screen 2. The physical objects can be the fingers $20_1$, $20_2$, $20_3$, $20_4$, $20_5$ of the hand or input devices, like pens. The different gestures should be different from each other in such a way that they can be detected in a reliable manner without having a user to "train" the measurement system 1. The gestures should also be consistent to each other as well as intuitive. A spread gesture is associated with a zoom function, for example. However, the gestures used within the measurement system 1 should be used by a right-handed person and similarly thereto by a left-handed person.

FIG. 2 shows an exemplary embodiment of a block-diagram of the measurement system 1 according to the present invention. The measurement system 1 includes a touch-screen 2, a control-unit 8, a central processing unit 9 and a gesture detection unit 10. The central processing unit 9 can be a processor and/or a FPGA (field programmable gate array). The touch-screen 2 is connected to the control-unit 8 by using a known interface, like a serial interface for example. The central processing unit 9 is also connected to the control-unit 8 by known interfaces. The control-unit 8 is further connected to the gesture detection unit 10 by using an interface. The plurality of buttons 3 and/or control knobs 4 and/or USB-connectors 6 and/or network connectors 11 and/or a measurement hardware 12 are connected by using known interfaces to the control-unit 8. The known interfaces can be of the type of USB-interfaces, PCI-interfaces (peripheral component interconnect), PCIe-interfaces (PCI-express), serial interfaces or interfaces in general, which can be used for transmitting data.

The control-unit 8 detects a position of one or more physical objects on and/or near the touch-screen 2. It has to be noted that the control-unit detects for example the position of the different fingers $20_1$, $20_2$, $20_3$, $20_4$, $20_5$, which are laid on the touch-screen 2. The control-unit 8 detects also a movement of one or more physical objects on and/or near the touch-screen 2. The control-unit 8 detects for example the movement of the different fingers $20_2$, $20_2$, $20_3$, $20_4$, $20_5$, which are spread along the touch-screen 2. A direct physical contact (touch) between the physical object and the touch-screen 2 is not needed in order to detect the physical object. It can be sufficient if the physical object is near the touch-screen 2. However, the distance between the physical object and the touch-screen 2 should not be larger than a few millimeters. The control-unit 8 detects the respective areas on the touch-screen 2, which are in contact with the one or the more physical objects. The control-unit 8 also detects the respective areas on the touch-screen 2 which are in contact by the one or more moving physical objects. These areas of the touch-screen 2 are then assigned to the respective pixels lying beneath. The control-unit 8 calculates the position of the touched pixels to each other from this information. For example it is important for successful activation of a command button, which is displayed on the touch-screen 2, that the absolute position of the touched pixel is detected in order to check, which command button is displayed in the respective area and therefore is touched by the one or the more physical objects. Furthermore, it is also very important to find out in which order the contacts or the movements are taking place to each other. This information can also be calculated by the control-unit 8 and/or by the central processing unit 9. After obtaining the detected position and/or the detected movement the control-unit 8 transmits this information to the gesture detection unit 10. The gesture detection unit 10 evaluates this information.

The gesture detection unit 10 receives the position and/or the movement of the physical object with respect to the respective pixel as well as the relation of the position and/or the movement to each other. The gesture detection unit 11 assigns the position and/or the movement of one or more physical objects to a gesture within a set of gestures. A set of gestures includes a plurality of gestures. It is very advantageous if the plurality of gestures differs from each other in a very large extent, because this ensures that also inexperienced users can draw gestures, which can be detected with a high possibility. Each gesture can include a plurality of parts wherein each part is drawn with the same or with a different object at the same time or at different times. However, each part of a gesture is mostly drawn by a movement of exactly one physical object.

As soon as the gesture detection unit 10 has detected a gesture it communicates the detected gesture and the position on the touch-screen 2 where the gesture has been detected to the measurement application 14$_2$. The measurement application 14$_2$ chooses, which function is executed depending on the detected gesture as well as the area on the touch-screen 2 where the gesture has been detected.

FIG. 2 also shows that the measurement application 14$_2$ as well as the operating system 14$_1$ are stored within a memory 13. The central processing unit 9 accesses the memory 13. The measurement application 14$_2$ can also access the measurement hardware 12 over the central processing unit 9 and the control-unit 8. The memory 13 can be a random access memory or a hard disc. Besides the operating system 14$_1$ and the measurement application 14$_2$, it is also possible that further applications are stored within the memory 13.

FIG. 3 shows a flow chart of the method for the measurement system 1 according to the present invention. Within a first step S$_1$ the control unit detects a position and/or a movement of one or more physical objects on and/or near the touch-screen 2. The physical object can be any finger 20$_1$, 20$_2$, 20$_3$, 20$_4$, 20$_5$ or a pen.

After detecting the position and/or movement of a physical object, a gesture detection unit 10 assigns the position and/or the movement of the one or more physical objects to one gesture within a set of gestures within the second step S$_2$.

Within a third step S$_3$ the detected gesture is communicated or transmitted to the measurement application 14$_2$ by the gesture detection unit 10.

Afterwards, the measurement application 14$_2$ performs a different function for the same detected gesture depending on a user interface 50, 51, 52, 55, 56, 57 displayed on the touch-screen 2 when the gesture is detected within step S$_5$.

FIG. 4 shows a hand with several fingers 20$_2$, 20$_2$, 20$_3$, 20$_4$, 20$_5$ for illustrating the notation of the different gestures. It has to be noted that all gestures can be drawn with the left hand and/or with the right hand.

FIG. 5A shows a display 2 in form of a touch-screen 2 of the measurement system 1 according to the present invention. On the touch-screen 2 there are three different user interfaces 50, 51, 52 displayed. A first user interface 50 displays at least one measured signal 53 in the time domain. A second user interface 51 displays the at least one measured signal 53 in the frequency domain. A fourth user interface 52 displays a hardware block diagram 54, which describes at least a part of the configuration of the measurement hardware 12. It can be seen that the user interfaces 50, 51, 52 do not overlap on the touch-screen 2. However, it is also possible that the different user interfaces 50, 51, 52 overlap on the touch-screen 2 in a certain manner. All the user interfaces 50, 51, 52 are part of the measurement application 14$_2$. It can be seen that all user interfaces 50, 51, 52 are displayed at the same time. The area which each user interface 50, 51, 52 occupies can be changed by the user or automatically for example depending on the amplitude of the measured signal 53 to be displayed.

It can be seen that within the third user interface 52 a hardware setup of the measurement system 1 is displayed. The block diagram 54 shows different components, which can be adjusted in order to influence the measurement of the measured signal 53. The hardware block diagram 54 allows adjustments concerning the probe of the measurement system as well as the amplifier and the filter network and last but not least the analog-digital-conversion circuit. The displayed options are only exemplary. There can also be a lot more adjustable options.

FIG. 5B shows the display 2 of the measurement system 1, showing three different user interfaces 50, 52, 55. The first user interface 50 displays the measured signal 53 in the time domain. The fourth already described user interface 52 displays a hardware block diagram 54 describing the configuration of the measurement hardware 12. A third user interface 55 displays the measured signal 53, which is already displayed within the first and/or second user interface 50, 51 with an adjusted zoom. It can be seen clearly that within the third user interface 55 only a part of the measured signal 53 is displayed compared to the first user interface 50. A box within the first user interface 50 and/or the second user interface 51 marks the position within the time axis as well as within the amplitude axis, which is enlarged within the third user interface 55. Within FIG. 5B the third user interface 55 displays an enlarged view of the measured signal 53 in the time domain. However, it is also possible that within the third user interface 55 the measured signal can be displayed in an enlarged view within the frequency domain.

FIG. 5C shows the touch-screen 2 of the measurement system 1 showing three different user interfaces 50, 52, 56, wherein one user interface 56 shows a zoomed view of at least one part of another user interface 50, wherein this part complies with a search request. It can be seen that the first user interface 50 displays the measured signal 53 within the time domain. It can also be seen that the fourth user interface 52 displays a hardware block diagram 54, describing the configuration of the measurement hardware 12. Furthermore, a sixth user interface 56 displays a part of the recorded acquisition. It can be seen that within the first user interface 50 a search window 61 is displayed. The search window 61 indicates that points within the measured signal 53 have to be highlighted, which equal an amplitude value of "1.2". It can be seen within the first user interface 50 that markers 60 are inserted above and/or below each point of the measured signal 53, which highlight the entered search value within the measured signal 53. The highlighting can also be done by different colors of the measured signal 53 instead of using the markers 60. In this case the search value was adjusted to 1.2 and thus, all values, which are equal to "1.2" are marked with a marker 60.

Within the sixth user interface 56 the measured signal 53 is displayed in a higher zoom in such a way that the first marker 60 is in the center of the sixth user interface 56. It can also be seen that another marker 60, also indicating an amplitude value of "1.2" of the measured signal 53 is near the first marker 60. By applying a special gesture, which is explained in more detail below, a user can toggle between all the markers 60. This means that after each toggle another marker is in the center of the sixth user interface 56 thereby displaying the measured signal 53 in another way. The sixth user interface 56 works best on already recorded measured signals 53. However, if the measurement system 1 is an oscilloscope it is also possible to use the sixth user interface 56 with a periodical signal in real time.

FIG. 5D shows the display of the measurement system 1, showing another user interface 57 displaying one of a plurality of recorded acquisitions. FIG. 5D shows the fifth user interface 57, displaying a history of recorded acquisitions. The measurement system 1 is also able to store a plurality of measured signals 53. In this case the measurement system 1 has stored "190" signals. By using a special gesture, which is described in more detail below, it is possible for a user to toggle between each of the recorded measured signals 53. In the present case the measured signal 53 having the number "75" out of "190" is displayed on the touch-screen 2. The signal is displayed in the time domain. However, it is also possible that the measured signal 53 is displayed in the frequency domain. It is also possible that the fifth user interface 57 is displayed on the touch-screen 2 together with a one or more of the other user interfaces 50, 51, 52, 55, 56, 57. The status bar 58 within FIG. 5D shows which one of the recorded measured signals 53 (recorded acquisitions) is displayed.

FIG. 6A shows the touch-screen 2 of the measurement display 1 showing a hardware block diagram 54. The hardware block diagram 54 is the same as the hardware block diagram 54 shown in the previous figures. The only difference is that the hardware block diagram 54 is orientated horizontally instead of vertically. The hardware block diagram 54 is displayed within the fourth user interface 52. It can be seen that the hardware block diagram 54 includes elements dealing with the probing device, the amplifier, the filter network and the analog-digital-conversion circuit. It can also be seen that there are indicators 61 marking those elements within the hardware block diagram 54 that can be adjusted. Within FIG. 6A the indicator 61 is only placed on the probing element for example. By applying a specific gesture a non-optical zoom within the probing elements options is carried out as shown below.

FIG. 6B shows the touch-screen 2 of the measurement system 1 showing one part of the hardware block diagram 54 with higher details. After applying a special gesture within FIG. 6A over the probing element, which is described below in more detail, further options of the probing element become visible to the user. For example the user can select, whether there is an AC or DC coupling between the signal source and the measurement system 1. By tapping the dotted lines the coupling can be changed for example. Furthermore, FIG. 6B also shows another indicator 61 surrounding an element showing the resistor value of the probing element. For example by applying the same gesture as in FIG. 6A again, a zoom within the resistor element (1 MΩ) is possible. By applying this gesture, further options become available for the user. The user can for example switch the resistor value to 1 kΩ. It has to be noted that any zoom within the hardware block diagram 54 is not an optical zoom enlarging various pixels.

If the gesture detecting unit 10 detects a horizontally spread gesture on the touch-screen 2 the gesture detection unit 10 transmits the detected gesture as well as the position on the touch-screen 2 to the measurement application $14_2$. A horizontally spread gesture can be seen in FIG. 7C. Two fingers from one hand or from a different hand move apart on a horizontally orientated line. If the measurement application $14_2$ detects the gesture on the first user interface 50, then the measurement application increases the horizontal scale of the time axis in the first user interface 50 in a further step.

It is also possible that not both fingers move apart from each other but that one finger is kept fixed. For example if the horizontally spread gesture is detected on the first user interface 50, wherein the left or the right fingertip is kept fixed and therefore only the right or left fingertip moves apart in a first step, the position in the time axis at the left fingertip or the right fingertip (the fingertip, which is fixed) is fixed and the horizontal scale of the time axis is increased from this position (where the fingertip is fixed) in the time axis in one direction in a further step. This ensures that not the whole time axis is increased but only a certain part.

It is also possible that, if the aforementioned gesture is detected within the first user 50 interface, a balance point between the left and the right fingertip is calculated. This balance point corresponds to the horizontal position of the time axis, which is fixed in a first step. In a further step the horizontal scale of the time axis is increased from this position in the time axis in both directions.

However, it is also possible that the measurement application $14_2$ detects the horizontally spread gesture on the second user interface 51. If this is the case, then the measurement application $14_2$ increases the resolution of the frequency axis in the second user interface 51. It has to be noted that the resolution bandwidth is not changed. The center frequency is also not changed by this gesture, only the resolution of the frequency axis is adjusted.

It is also possible that the left or the right fingertip is kept fixed and that only the right or left fingertip moves apart in a first step. The frequency axis is fixed at this position. The resolution of the frequency axis is increased from this position in the frequency axis in one direction. It is also possible that if the aforementioned gesture is detected on the second user interface 51 a balance point between the left and the right fingertip is calculated, which corresponds to the horizontal position of the frequency axis, which is fixed in a first step. The resolution of the frequency axis is increased from this position in the frequency axis in both directions in a further step.

If the aforementioned gesture is detected on the third user interface 55 the horizontal zoom factor for the displayed measured signal 53 is increased. If the left or the right fingertip is kept fixed and if only the right or the left fingertip moves apart, the position in the time or frequency axis is fixed at the left fingertip or the right fingertip, wherein the zoom factor of the time or frequency axis increases from this position. It is also possible that a balance point is calculated, if this gesture is detected on the third user interface 56, wherein the balance point corresponds to the horizontal position of the time or frequency axis, which is fixed and marked as the center for the zoom in a first step, wherein the zoom increases from the center in both horizontal directions in a second step.

If the gesture is detected on the fourth user interface 52, the measurement application $14_2$ also responds differently. The measurement application $14_2$ increases the level of detail of the respective hardware block in the hardware block diagram 54 as described with respect to FIG. 6A and FIG. 6B.

Figure 7B:
Figure 7C:
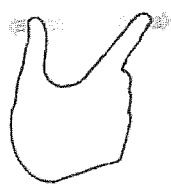
Figure 7D:
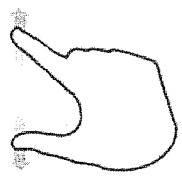

As already mentioned, the measurement application 14$_2$ acts differently depending on the user interface 50, 51, 52, 55, 56, 57, on which a gesture is detected. If the gesture detection unit 10 detects a vertically spread gesture as shown in FIG. 7D, the measurement application 14$_2$ may perform different functions. This gesture is drawn by touching the surface with any two fingertips and moving them apart vertically. If the vertically spread gesture is detected on the first user interface 50, the vertical scale of the displayed measured signal 53 is increased. It is also possible that a balance point of the left and the right fingertip is calculated, which corresponds to the vertical position of the displayed measured signal 53. The vertical position is fixed at the balance point and the vertical scale of the displayed measured signal 53 is increased in a second step.

If the vertically spread gesture is detected on the second user interface 51, the vertical scale of the displayed measured signal 53 in the second user interface 51 is increased. It is also possible that the balance point of the left and the right fingertip is calculated, which corresponds to the vertical position of the displayed measured signal 53. The vertical position is fixed at the balance point and the vertical scale of the displayed measured signal 53 is increased in a further step.

If the vertically spread gesture is detected on the third user interface 55, the vertical zoom factor is increased for the displayed measured signal 53. It is also possible that a balance point of the left and the right fingertip is calculated, which corresponds to the vertical position of the time or frequency axis. The vertical position of the time or frequency axis is then fixed at the balance point and marked as the center for the zoom, wherein the zoom increases from the center in both vertical directions.

If the vertical spread gesture is detected on the fourth user interface 52, the level of detail of the respective hardware block in the hardware block diagram 54 is increased as shown in FIG. 6A and FIG. 6B.

Figure 7E:
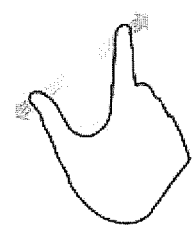

The measurement application 14$_2$ also performs different functions if a diagonally spread gesture is detected on the touch-screen 2 by the gesture detection unit 10. Such a gesture is shown in FIG. 7E. This gesture can be drawn by touching the surface with any two fingertips and moving them apart diagonally. If such a gesture is detected on the first user interface 50 the vertical and the horizontal scale of the displayed measured signal 53 in the first user interface is increased. It is also possible that a balance point of the left and the right fingertip is calculated, which corresponds to the position of the displayed measured signal 53. The position of the displayed measured signal 53 is fixed at the balance point and the vertical and horizontal scale of the displayed measured signal 53 is increased around this position.

If this gesture is detected on the second user interface 51, the horizontal and vertical scale of the displayed measured signal 53 is increased. It is also possible that the balance point of the left and the right fingertip is calculated, which corresponds to the position of the displayed measured signal 53. The position of the displayed measured signal 53 is then fixed and the horizontal and vertical scale of the displayed measured signal 53 is increased.

If this gesture is detected on the third user interface 55, the horizontal and vertical zoom factor is increased for the displayed measured signal 53. It is also possible that a balance point of the left and the right fingertip is calculated, which corresponds to the position of the time or frequency axis. This position of the time or frequency axis is then fixed and marked as the center for the zoom, wherein the zoom is increased starting from the center in both horizontal and vertical directions.

It is also possible that this gesture is detected on the fourth user interface 52 and that the level of detail of the respective hardware blocks in the hardware block diagram 54 is increased as shown in FIG. 6A and FIG. 6B.

Figure 7F:
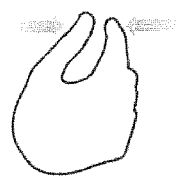

The same also applies if the gesture detection unit 10 detects a horizontally pinch gesture on the touch-screen 2. Such a horizontally pinch gesture is displayed in FIG. 7F. This gesture is drawn by touching the surface with any two fingertips and bringing them closer together horizontally. If such a gesture is detected on the first user interface 50, the horizontal scale of the time axis is decreased. It is also possible that, if the left or right fingertip is kept fixed and if only the right or the left fingertip moves together to the fixed fingertip, that the position in the time axis is fixed at the left fingertip or the right fingertip (the fingertip, which is kept fixed) and that the horizontal scale of the time axis decreases from this position in the time axis in one direction.

It is also possible that a balance point of the left and the right fingertip is calculated, which corresponds to the horizontal position of the time axis. This position is fixed and the horizontal scale of the time axis is decreased from this position in the time axis in both directions.

If this gesture is detected on the second user interface 51 a resolution of the frequency axis in the second user interface 51 is decreased. It is also possible that, if the left or the right fingertip is kept fixed, that only the right or the left fingertip moves together in a first step and that the position in the frequency axis is fixed at the left or the right fingertip (the fingertip, which is kept fixed) and that the resolution of the frequency axis is decreased from this position in the frequency axis in one direction.

It is also possible that a balance point of the left and the right fingertip is calculated, which corresponds to the horizontal position of the frequency axis. This position is fixed and the resolution of the frequency axis is decreased from this position in the frequency axis in both directions.

If the gesture is detected on the third user interface 55, the horizontal zoom factor is decreased for the displayed measured signal 53. It is also possible, if the left or the right fingertip is kept fixed and if only the right or the left fingertip move together in a first step, that the position in the time or frequency axis is fixed at the left fingertip or the right fingertip (the fingertip, which is kept fixed) and that the zoom factor of the time or frequency axis is decreased from this position.

It is also possible that a balance point of the left and right fingertip is calculated, which corresponds to the horizontal position of the time or frequency axis. This position is fixed and marked as the center for the zoom, wherein the zoom decreases from the center in both horizontal directions.

If the gesture is detected on the fourth user interface 52, the level of detail of the respective hardware blocks in the hardware block diagram 54 is decreased.

Figure 7G:
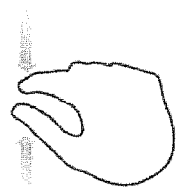

The behavior of the measurement application 14$_2$ is also different, if a vertically pinch gesture as shown in FIG. 7G is detected by the gesture detection unit 10 on the touch-screen 2 on different user interfaces 50, 51, 52, 55, 56, 57. This gesture is drawn by touching the surface of the touch-screen 2 with any two fingertips and bringing them closer together vertically. If the vertically pinch gesture is detected on the first user interface 50, the vertical scale of the displayed measured signal 53 is decreased. It is also possible that a balance point of the left and right fingertip is calculated, which corresponds to the vertical position of the displayed measured signal 53. This position is then fixed and the vertical scale of the displayed measured signal 53 is decreased around this position.

If the gesture is detected on the second user interface 51, the vertical scale of the displayed measured signal 53 is decreased. It is also possible that a balance point of the left and the right fingertip is calculated, which corresponds to the vertical position of the displayed measured signal 53. This position is fixed and the vertical scale of the displayed measured signal 53 is decreased around this position.

The same also applies, if the gesture is detected on the third user interface 55. The vertical zoom factor for the displayed measured signal 53 is decreased. It is also possible that a balance point of the left and the right fingertip is calculated, which corresponds to the vertical position of the time or frequency axis. This position is fixed and marked as the center for the zoom, wherein the zoom decreases from the center in both vertical directions.

The same also applies, if the gesture is detected on the fourth user interface 52. The level of detail of the respective hardware blocks in the hardware block diagram 54 is decreased.

Figure 7H:
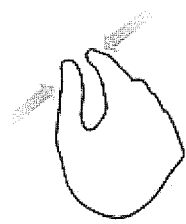

The measurement application 14₂ also performs different functions depending on where a diagonally pinch gesture is detected. A diagonally pinch gesture as shown in FIG. 7H is drawn by touching the surface of the touch-screen with any two fingertips and bringing them closer together diagonally. This results, if detected on the first user interface 50, in a decreasing of the vertical and horizontal scale of the displayed measured signal 53. It is also possible that a balance point of the left and the right fingertip is calculated, which corresponds to the position of the displayed measured signal 53. This position is fixed and the vertical and horizontal scale of the displayed measured signal 53 is decreased if the above-mentioned gesture is detected.

If the gestured is detected on the second user interface 51, the horizontal and vertical scale of the displayed measured signal 53 is decreased. It is also possible that a balance point of the left and the right fingertip is calculated, which corresponds to the position of the displayed measured signal 53. This position is then fixed and the horizontal and vertical scale of the displayed measured signal 53 is decreased.

If the above-mentioned gesture is detected on the third user interface 55, the horizontal and vertical zoom factor is decreased for the displayed measured signal 53. It is also possible that a balance point of the left and the right fingertip is calculated, which corresponds to the position of the time or frequency axis. This position is fixed and marked as the center for the zoom, wherein the zoom decreases from the center in both horizontal and vertical directions.

If the gesture is detected on the fourth user interface 52, the level of detail of the respective hardware blocks in the hardware block diagram 54 decreases. Such a decrease is shown when going from FIG. 6B back to FIG. 6A.

The measurement application 14₂ also acts differently, if a drag-left or drag-right gesture is detected on the touch-screen 2 by the gesture detection unit 10. Such a drag-left or drag-right gesture is shown in FIG. 7I. This gesture is drawn by moving any two fingertips over the surface of the touch-screen 2 along a single line to the right or to the left without losing contact.

If this gesture is detected on the first user interface 50, the horizontal position of the displayed measured signal 53 or of the reference point is moved to the left or to the right. The question, whether the measured signal 53 or a reference point is moved to the left or to the right depends only on a former detection of a horizontal two-finger tap gesture as shown in FIG. 7L. Such a gesture (FIG. 7L) is drawn by briefly touching the surface of the touch-screen 2 with any two fingertips with the fingertips being horizontally aligned. This allows a user to toggle between the measured signal 53 or the reference point. If the drag-left or the drag-right gesture is applied in a further step, the reference point or the measured signal 53 can then be moved.

If this gesture is detected on the second user interface 51, the center frequency of the measured signal 53 can be moved to the left or to the right.

If this gesture is detected on the third user interface 55, the horizontal position of the displayed measured signal 53 is moved to the left or to the right.

The measurement application 14₂ also acts differently depending on the respective user interfaces 50, 51, 52, 55, 56 and 57 where a drag-up or drag-down gesture is detected. A drag-up or drag-down gesture can be seen in FIG. 7J. This gesture is drawn by a user by touching the surface with two fingertips and by moving the two fingertips over the surface along a single line up or down without losing contact.

If this gesture is detected on the first user interface 50, the vertical position of a displayed measured signal 53 or of an offset if moved up or down. The question, whether the vertical position of the measured signal 53 or an offset is moved up and down, depends whether a vertical two-finger tap gesture is detected. Such a gesture can be seen in FIG. 7M. This gesture (FIG. 7M) can be drawn by briefly touching the surface with any two fingertips with the fingertips being vertically aligned. A two-finger tap gesture allows the user to toggle between the selection of the vertical position of the measured signal 53 or the offset. The measured signal 53 or the offset is then moved by the drag-up or drag-down gesture in the following.

If the drag-up or drag-down gesture is detected on the second user interface 51, the displayed measured signal 53 is moved up or down.

If the drag-up or drag-down gesture is detected on the third user interface 55, the vertical position of the displayed measured signal 53 or of the offset is moved up or down. The question, whether the vertical position of the displayed measured signal 53 or the offset is moved up or down depends on detecting a vertical two-finger tap gesture before. By detecting a vertical two-finger tap gesture (FIG. 7M) a user can toggle between the displayed measured signal 53 or the offset to be moved in a further step.

The measurement application 14₂ also performs a different function when a rotate-left or rotate-right gesture is detected on the touch-screen 2 by the gesture detection unit. A rotate-left or rotate-right gesture can be seen in FIG. 7N, FIG. 7O and FIG. 7P. The gesture within FIG. 7N can be drawn by a user by touching the surface of the touch-screen 2 with two fingers and moving the fingers in a clockwise or counterclockwise direction. The gesture within FIG. 7O can be drawn by touching the touch-screen 2 with one finger and moving another finger in a clockwise or counterclockwise direction around the first finger serving as a center. The gesture of FIG. 7P can be drawn by touching the surface of the touch-screen 2 with two fingers, which are close (no spread) to each other and by moving them in a clockwise or counterclockwise direction.

If such a gesture is detected on the first user interface 50, a record length or a horizontal resolution is increased or decreased, depending on whether the record length or the horizontal resolution is selected before.

If the rotate-left or rotate-right gesture is detected on the second user-interface 51, the resolution bandwidth is increased or decreased. An increasing can occur for example by rotating to the right, wherein a decreasing can occur by rotating to the left.

The same also applies, if the gesture detection unit 10 detects a parallel drag-left or parallel drag-right gesture on the touch-screen 2. A parallel drag-left or parallel drag-right gesture can be seen within FIG. 7k. A user can draw such a gesture by moving any two fingertips over the surface of the touch-screen along two parallel lines to the right or to the left without losing contact.

The measurement application $14_2$ also performs different functions depending on the user interface, on which the gesture has been drawn. If a parallel drag-left or parallel drag-right gesture is detected on the fifth user interface 57, the measurement application toggles between single acquisitions of the history of recorded acquisitions in a temporal backward or forward direction.

If a parallel drag-left or parallel drag-right gesture is detected on the sixth user interface 56, it is possible to toggle between the search results of the recorded acquisitions in a temporal backward or temporal forward direction. It is obvious that only acquisitions are displayed, which contain the searched value. For example, if an amplitude value of "1.2" is searched, only acquisitions are displayed, which contain at least one amplitude value of "1.2". Those values are then highlighted by using a marker 60 and/or different colors of the displayed measurement signal at the respective parts.

The measurement application $14_2$ also performs different functions when a flick-left or flick-right gesture is detected on the touch-screen 2 by the gesture detection unit 10. Such a flick-left or flick-right gesture is shown in FIG. 7Q. This gesture is drawn by quickly brushing the surface with the fingertip to the right or to the left. The term "quickly" can be adjusted within the measurement system 1. A time measuring unit, which is also part of the measurement system 1, measures the speed of the movement of a single finger. If this speed exceeds a predetermined speed, then a flick-right or a flick-left gesture is detected. Thus, the term "quickly" only implies that the movement is quicker than a predetermined adjustable value.

If this gesture is detected on the fifth user interface 57, the measurement application $14_2$ moves through single acquisitions of the history of recorded acquisitions in a temporal fast backward or fast forward direction. The moving speed thereby increases with the detected speed of the flick-left or flick-right gesture. The movement speed is thereby proportional to the speed of the flick-left or flick-right gesture. However, the moving speed can be decreased towards the end of the recorded acquisitions. Also any tap as shown in FIG. 7A or 7B (single touch or multiple touches of the touch-screen 2 with one finger) stops the moving.

If the flick-left or flick-right gesture is detected on the sixth user interface 56, the measurement application $14_2$ moves through the search results of recorded acquisitions in temporal fast backward or fast forward direction. The moving speed increases thereby with the detected speed of the flick-left or flick-right gesture. The moving speed is thereby proportional to the speed of the flick-left or flick-right gesture. However, it is also possible that the moving speed decreases when moving through a single acquisition, which is separated from the beginning or the end of the history of recorded acquisitions by a predetermined number of acquisitions. This means that the moving speed is reduced towards the beginning or towards the end of the recorded acquisitions, which are searched. The movement also stops by a single or multiple tap on the touch-screen 2.

It is also clear that the measurement application $14_2$ is also able to perform a different function if a respective gesture is detected in a respected area of a single user interface. For example, the functions performed by the measurement application $14_2$ can be different, if the same gesture is detected at the top left of the user interface compared to if the gesture is detected at the bottom right of the same user interface. The term "first user interface 50, second user interface 51, third user interface 55, fourth user interface 52, fifth user interface 57 and sixth user interface 56" can be replaced by the terms "first area, second area, third area, fourth area, fifth area and sixth area of a one user interface".

The method as well as the system can be used within any measurement system 1 such as an oscilloscope, a spectrum analyzer, etc.

The invention claimed is:

1. A method for a measurement system, wherein the measurement system comprises a touch-screen, a control-unit for the touch-screen, a measurement hardware, a measurement application and a gesture detection unit, wherein the measurement application interacts with the measurement hardware, the method comprising steps of:
   detecting a position of one or more physical objects on and/or near the touch-screen by the control-unit, and/or
   detecting a movement of one or more physical objects on and/or near the touch-screen by the control-unit;
   assigning the position and/or the movement of one or more physical objects to one gesture within a set of gestures by a gesture detection unit;
   communicating the detected gesture to the measurement application;
   detecting a parallel drag-left or parallel drag-right gesture on the touch-screen by the gesture detection unit by:
      detecting the gesture on a fifth user interface in a first step and toggling between single acquisitions of the history of recorded acquisitions in temporal backward or forward direction in a second step, and/or
      detecting the gesture on a sixth user interface in a first step and toggling between the search results of the recorded acquisitions in temporal backward or forward direction in a second step,
   wherein the measurement application performs a different function for the same detected gesture depending on a user interface of the measurement application which is displayed on the touch-screen when the gesture is detected, and
   a first user interface displays a history of recorded acquisitions, and/or
   a second user interface displays search results of recorded acquisitions.

2. The method according to claim 1, wherein:
   a third user interface displays at least one measured signal in the time domain, and/or
   a fourth user interface displays at least one measured signal in the frequency domain, and/or
   the fifth user interface displays the measured signal which is displayed in the third, and/or fourth user interface with an adjusted zoom, and/or
   the sixth interface displays a hardware block diagram describing the configuration of the measurement hardware.

3. The method according to claim 2, further comprising detecting a horizontally spread gesture on the touch-screen by the gesture detection unit by:
   detecting the gesture on the third user interface in a first step and increasing the horizontal scale of the time axis in the third user interface in a second step, or detecting the gesture on the third user interface, wherein the left or right fingertip is kept fixed and only the right or left fingertip moves apart in a first step and fixing the position in the time axis at the left fingertip or the right fingertip and increasing the horizontal scale of the time axis from this position in the time axis in one direction in a second step, or detecting the gesture on the third user interface, wherein a balance point of the left and the right fingertip corresponds to the horizontal position of the time axis which is fixed in a first step and increasing the horizontal scale of the time axis from this position in the time axis in both directions in a second step, and/or detecting the gesture on the fourth user interface in a first step and increasing a resolution of the frequency axis in the fourth user interface in a second step, or detecting the gesture on the fourth user interface, wherein the left or right fingertip is kept fixed and only the right or left fingertip moves apart in a first step and fixing the position in the frequency axis at the left fingertip or the right fingertip and increasing the resolution of the frequency axis from this position in the frequency axis in one direction in a second step, or detecting the gesture on the fourth user interface, wherein a balance point of the left and the right fingertip corresponds to the horizontal position of the frequency axis which is fixed in a first step and increasing the resolution of the frequency axis from this position in the frequency axis in both directions in a second step, and/or detecting the gesture on the fifth user interface in a first step, and increasing the horizontal zoom factor for the displayed measured signal in a second step, or detecting the gesture on the fifth user interface, wherein the left or right fingertip is kept fixed and only the right or left fingertip moves apart in a first step and fixing the position in the time or frequency axis at the left fingertip or the right fingertip and increasing the zoom factor of the time or frequency axis from this position in a second step, or detecting the gesture on the fifth user interface, wherein a balance point of the left and the right fingertip corresponds to the horizontal position of the time or frequency axis which is fixed and marked as the center for the zoom in a first step and increasing the zoom from the center in both horizontal directions in a second step, and/or detecting the gesture on the sixth user interface in a first step and increasing the level of detail of the respective hardware blocks in the hardware block diagram in a second step.

4. The method according to claim 3, further comprising:
decreasing the moving speed when moving through a single acquisition which is separated from the beginning or the end of the history of recorded acquisitions by a predetermined number of acquisitions, and/or
stopping the movement if a tap on the touch-screen is detected by the gesture detection unit.

5. The method according to claim 2, further comprising detecting a vertically spread gesture on the touch-screen by the gesture detection unit by:
detecting the gesture on the third user interface in a first step and increasing the vertical scale of the displayed measured signal in the third user interface in a second step, or detecting the gesture on the third user interface, wherein a balance point of the left and the right fingertip corresponds to the vertical position of the displayed measured signal which is fixed in a first step and increasing the vertical scale of the displayed measured signal in a second step, and/or detecting the gesture on the fourth user interface in a first step and increasing the vertical scale of the displayed measured signal in the fourth user interface in a second step, or detecting the gesture on the fourth user interface, wherein a balance point of the left and the right fingertip corresponds to the vertical position of the displayed measured signal which is fixed in a first step and increasing the vertical scale of the displayed measured signal in a second step, and/or detecting the gesture on the fifth user interface in a first step and increasing the vertical zoom factor for the displayed measured signal in a second step, or detecting the gesture on the fifth user interface, wherein a balance point of the left and the right fingertip corresponds to the vertical position of the time or frequency axis which is fixed and marked as the center for the zoom in a first step and increasing the zoom from the center in both vertical directions in a second step, and/or detecting the gesture on the sixth user interface in a first step and increasing the level of detail of the respective hardware blocks in the hardware block diagram in a second step.

6. The method according to claim 2, further comprising detecting a diagonally spread gesture on the touch-screen by the gesture detection unit by:
detecting the gesture on the third user interface in a first step and increasing the vertical and horizontal scale of the displayed measured signal in the third user interface in a second step, or detecting the gesture on the third user interface, wherein a balance point of the left and the right fingertip corresponds to the position of the displayed measured signal which is fixed in a first step and increasing the vertical and horizontal scale of the displayed measured signal in a second step, and/or detecting the gesture on the fourth user interface in a first step and increasing the horizontal and vertical scale of the displayed measured signal in the fourth user interface in a second step, or detecting the gesture on the fourth user interface, wherein a balance point of the left and the right fingertip corresponds to the position of the displayed measured signal which is fixed in a first step and increasing the horizontal and vertical scale of the displayed measured signal in a second step, and/or detecting the gesture on the fifth user interface in a first step and increasing the horizontal and vertical zoom factor for the displayed measured signal in a second step, or detecting the gesture on the fifth user interface, wherein a balance point of the left and the right fingertip corresponds to the position of the time or frequency axis which is fixed and marked as the center for the zoom in a first step and increasing the zoom from the center in both horizontal and vertical directions in a second step, and/or detecting the gesture on the sixth user interface in a first step and increasing the level of detail of the respective hardware blocks in the hardware block diagram in a second step.

7. The method according to claim 2, further comprising detecting a horizontally pinch gesture on the touch-screen by the gesture detection unit by:
detecting the gesture on the third user interface in a first step and decreasing the horizontal scale of the time axis in the third user interface in a second step, or detecting the gesture on the third user interface, wherein the left or right fingertip is kept fixed and only the right or left fingertip moves together in a first step and fixing the position in the time axis at the left fingertip or the right fingertip and decreasing the horizontal scale of the time axis from this position in the time axis in one direction in a second step, or detecting the gesture on the third user interface, wherein a balance point of the left and the right fingertip corresponds to the horizontal position of the time axis which is fixed in a first step and decreasing the horizontal scale of the time axis from this position in the time axis in both directions in a second step, and/or detecting the gesture on the fourth user interface in a first step and decreasing a resolution of the frequency axis in the fourth user interface in a second step, or detecting the gesture on the fourth user interface, wherein the left or right fingertip is kept fixed and only the right or left fingertip moves together in a first step and fixing the position in the frequency axis at the left fingertip or the right fingertip and decreasing the resolution of the frequency axis from this position in the frequency axis in one direction in a second step, or detecting the gesture on the fourth user interface, wherein a balance point of the left and the right fingertip corresponds to the horizontal position of the frequency axis which is fixed in a first step and decreasing the resolution of the frequency axis from this position in the frequency axis in both directions in a second step, and/or detecting the gesture on the fifth user interface in a first step and decreasing the horizontal zoom factor for the displayed measured signal in a second step, or detecting the gesture on the fifth user interface, wherein the left or right fingertip is kept fixed and only the right or left fingertip moves together in a first step and fixing the position in the time or frequency axis at the left fingertip or the right fingertip and decreasing the zoom factor of the time or frequency axis from this position in a second step, or detecting the gesture on the fifth user interface, wherein a balance point of the left and the right fingertip corresponds to the horizontal position of the time or frequency axis which is fixed and marked as the center for the zoom in a first step and decreasing the zoom from the center in both horizontal directions in a second step, and/or detecting the gesture on the sixth user interface in a first step and decreasing the level of detail of the respective hardware blocks in the hardware block diagram in a second step.

8. The method according to claim 2, further comprising detecting a vertically pinch gesture on the touch-screen by the gesture detection unit by:

detecting the gesture on the third user interface in a first step and decreasing the vertical scale of the displayed measured signal in the third user interface in a second step, or detecting the gesture on the third user interface, wherein a balance point of the left and the right fingertip corresponds to the vertical position of the displayed measured signal which is fixed in a first step and decreasing the vertical scale of the displayed measured signal in a second step, and/or detecting the gesture on the fourth user interface in a first step and decreasing the vertical scale of the displayed measured signal in the fourth user interface in a second step, or detecting the gesture on the fourth user interface, wherein a balance point of the left and the right fingertip corresponds to the vertical position of the displayed measured signal which is fixed in a first step and decreasing the vertical scale of the displayed measured signal in a second step, and/or detecting the gesture on the fifth user interface in a first step and decreasing the vertical zoom factor for the displayed measured signal in a second step, or detecting the gesture on the fifth user interface, wherein a balance point of the left and the right fingertip corresponds to the vertical position of the time or frequency axis which is fixed and marked as the center for the zoom in a first step and decreasing the zoom from the center in both vertical directions in a second step, and/or detecting the gesture on the sixth user interface in a first step and decreasing the level of detail of the respective hardware blocks in the hardware block diagram in a second step.

9. The method according to claim 2, further comprising detecting a diagonally pinch gesture on the touch-screen by the gesture detection unit by:

detecting the gesture on the third user interface in a first step and decreasing the vertical and horizontal scale of the displayed measured signal in the third user interface in a second step, or detecting the gesture on the third user interface, wherein a balance point of the left and the right fingertip corresponds to the position of the displayed measured signal which is fixed in a first step and decreasing the vertical and horizontal scale of the displayed measured signal in a second step, and/or detecting the gesture on the fourth user interface in a first step and decreasing the horizontal and vertical scale of the displayed measured signal in the fourth user interface in a second step, or detecting the gesture on the fourth user interface, wherein a balance point of the left and the right fingertip corresponds to the position of the displayed measured signal which is fixed in a first step and decreasing the horizontal and vertical scale of the displayed measured signal in a second step, and/or detecting the gesture on the fifth user interface in a first step and decreasing the horizontal and vertical zoom factor for the displayed measured signal in a second step, or detecting the gesture on the fifth user interface, wherein a balance point of the left and the right fingertip corresponds to the position of the time or frequency axis which is fixed and marked as the center for the zoom in a first step and decreasing the zoom from the center in both horizontal and vertical directions in a second step, and/or detecting the gesture on the sixth user interface in a first step and decreasing the level of detail of the respective hardware blocks in the hardware block diagram in a second step.

10. The method according to claim 2, further comprising detecting a drag-left or drag-right gesture on the touch-screen by the gesture detection unit by:

detecting the gesture on the third user interface in a first step and moving the horizontal position of the displayed measured signal or of a reference point to the left or to the right in a second step, wherein depending upon a former detection of a horizontal two-finger tap gesture the horizontal position of the displayed measured signal or of the reference point is moved, and/or detecting the gesture on the fourth user interface in a first step and moving the center frequency to the left or to the right in a second step, and/or detecting the gesture on the fifth user interface in a first step and moving the horizontal position of the displayed measured signal to the left or to the right in a second step.

11. The method according to claim 2, further comprising detecting a drag-up or drag-down gesture on the touchscreen by the gesture detection unit by:
- detecting the gesture on the third user interface in a first step and moving the vertical position of the displayed measured signal or of an offset up or down in a second step, wherein depending upon a former detection of a vertical two-finger tap gesture the vertical position of the displayed measured signal or of the offset is moved, and/or
- detecting the gesture on the fourth user interface in a first step and moving the displayed measured signal up or down in a second step, and/or
- detecting the gesture on the fifth user interface in a first step and moving the vertical position of the displayed measured signal or of an offset up or down in a second step, wherein depending upon a former detection of a vertical two-finger tap gesture the vertical position of the displayed measured signal or of the offset is moved.

12. The method according to claim 2, further comprising detecting a rotate-left or rotate-right gesture on the touchscreen by the gesture detection unit by:
- detecting the gesture on the third user interface in a first step and increasing or decreasing a record length or a horizontal resolution in a second step depending on whether the record length or the horizontal resolution is selected before, and/or
- detecting the gesture on the fourth user interface in a first step and increasing or decreasing a resolution bandwidth in a second step.

13. The method according to claim 2, further comprising detecting a flick-left or flick-right gesture on the touchscreen by the gesture detection unit by:
- detecting the gesture on the first user interface in a first step and moving through single acquisitions of the history of recorded acquisitions in temporal fast backward or fast forward direction in a second step, wherein the moving speed increases with the detected speed of the flick-left or flick-right gesture, and/or
- detecting the gesture on the second user interface in a first step and moving through the search results of recorded acquisitions in temporal fast backward or fast forward direction in a second step, wherein the moving speed increases with the detected speed of the flick-left or flick-right gesture.

14. A non-transitory computer readable storage medium containing program instructions for causing a computer to perform the method of claim 1.

* * * * *

UNITED STATES PATENT AND TRADEMARK OFFICE
CERTIFICATE OF CORRECTION

| | |
|---|---|
| PATENT NO. | : 9,965,174 B2 |
| APPLICATION NO. | : 14/783033 |
| DATED | : May 8, 2018 |
| INVENTOR(S) | : Wolfgang Herbordt et al. |

It is certified that error appears in the above-identified patent and that said Letters Patent is hereby corrected as shown below:

On the Title Page

Item (72), the first inventor's information which reads:
"Wlfgang Herbordt, Ottobrunn (DE);"

Should read:
"Wolfgang Herbordt, Ottobrunn (DE);"

Signed and Sealed this
Tenth Day of July, 2018

Andrei Iancu
*Director of the United States Patent and Trademark Office*